United States Patent [19]  [11] 4,093,012
Detwiler  [45] June 6, 1978

[54] SKID PREVENTIVE TIRE ASSEMBLY
[75] Inventor: John H. Detwiler, Manhasset, N.Y.
[73] Assignee: Detwiler Corporation, Westbury, N.Y.
[21] Appl. No.: 680,492
[22] Filed: Apr. 26, 1976
[51] Int. Cl.² ............................................. B60C 27/10
[52] U.S. Cl. ..................................... 152/226; 152/222
[58] Field of Search ................... 152/225 R, 226, 221, 152/222, 229, 230, 241, 233, 210; 244/151 R; 294/74, 77; 24/265 C, 265 BC, 265 CD

[56] References Cited
U.S. PATENT DOCUMENTS

| 2,369,203 | 2/1945 | Ashton | 244/151 R |
|---|---|---|---|
| 2,605,065 | 7/1952 | Wilkins | 244/151 R |
| 2,632,491 | 3/1953 | Eisner | 152/222 |
| 2,661,042 | 12/1953 | Eisner | 152/222 |
| 2,823,155 | 2/1958 | Brown et al. | 24/265 CD |
| 3,042,113 | 7/1962 | Kramer | 24/265 C |
| 3,102,318 | 9/1963 | Van Buren, Jr. | 24/265 C |
| 3,343,862 | 9/1967 | Holmes | 294/74 |
| 3,422,508 | 1/1969 | Higuchi | 24/265 CD |
| 3,817,307 | 6/1974 | Detwiler | 152/226 |

Primary Examiner—Albert J. Makay
Assistant Examiner—Donald W. Underwood
Attorney, Agent, or Firm—Kane, Dalsimer, Kane, Sullivan & Kurucz

[57] ABSTRACT

Anti-skid assembly adapted to be removably mounted on a tire. The assembly includes a plurality of deformable transfer straps adapted to be mounted on the surface of the tire by a releasable anchoring structure. The straps are adapted to normally rest relatively flat against the surface of the tire and to be shifted to a substantially perpendicular position when the tire skids with respective road surface to increase the frictional and mechanical engagement with the road surface and to return to the normal flat configuration against the tire surface after leaving engagement with the road surface. The anchoring structure includes braided cables which are parted to accept fasteners connecting the straps to the cable. Studs can be provided on the transverse members. A quick acting latch structure is provided to hook and unhook the braided cables.

20 Claims, 23 Drawing Figures

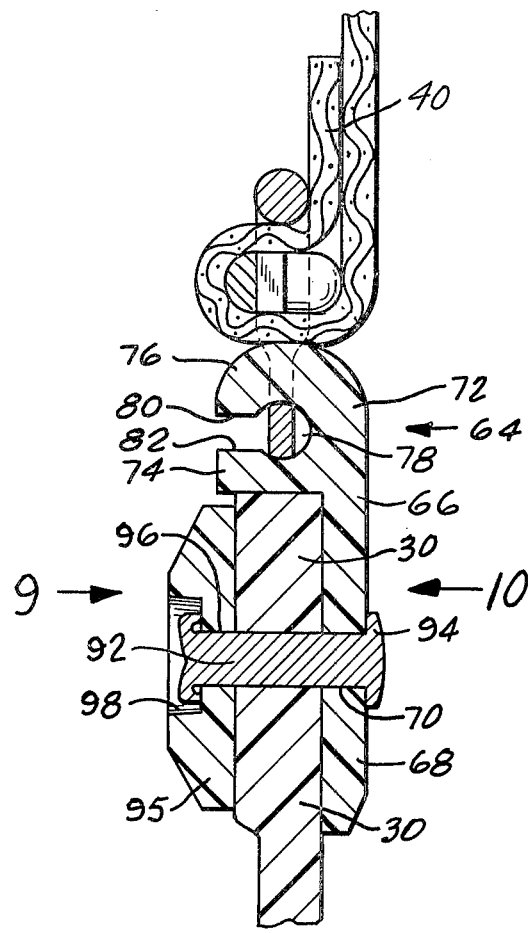
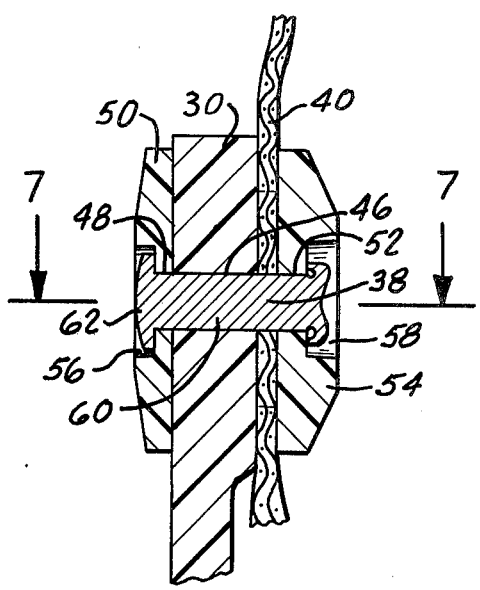
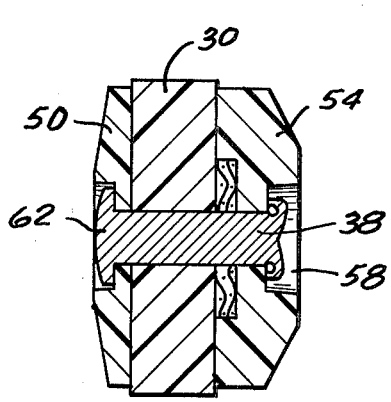

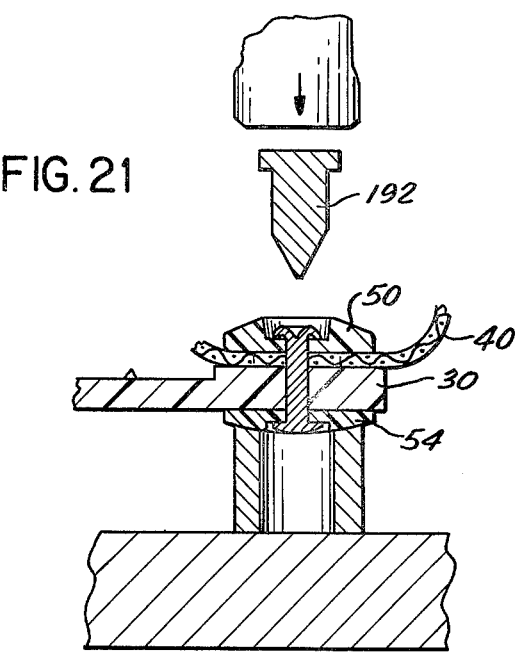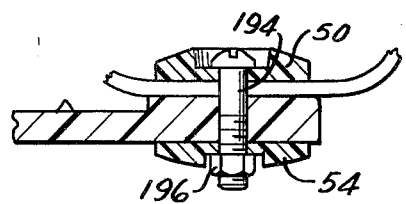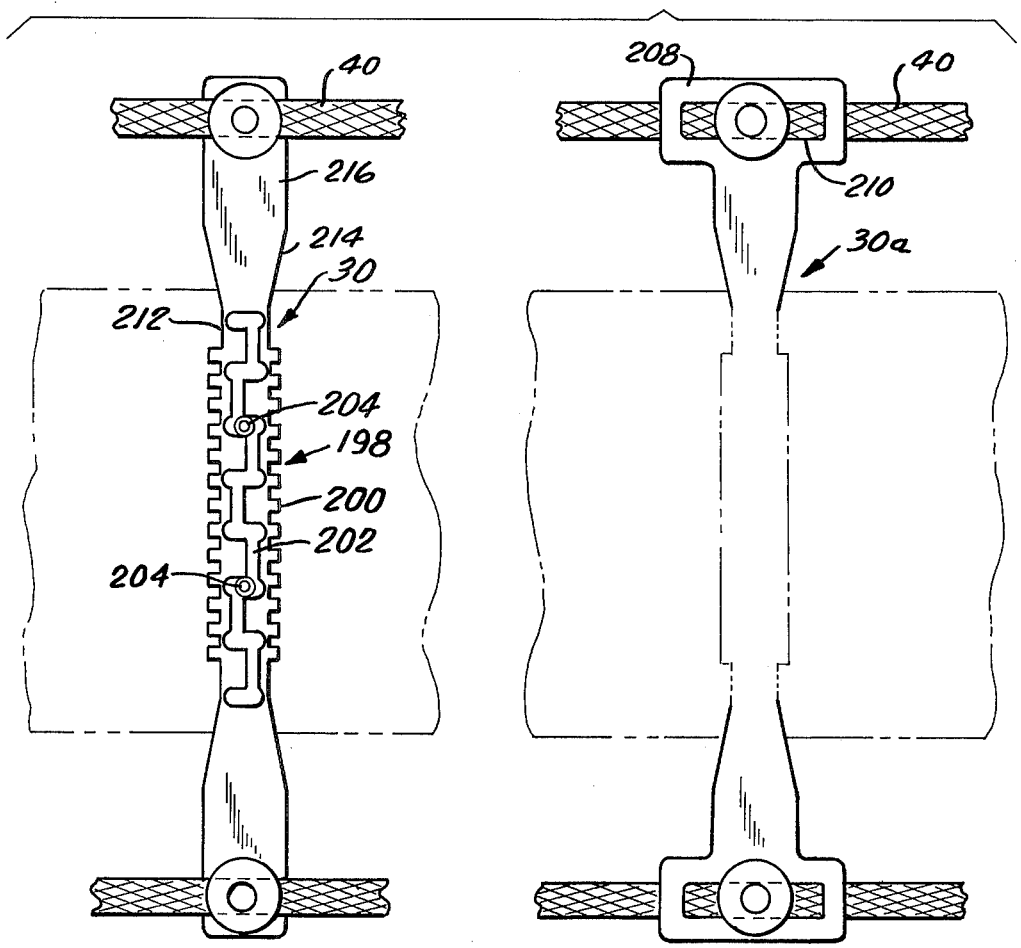

SKID PREVENTIVE TIRE ASSEMBLY

BACKGROUND OF THE INVENTION

There have been numerous different types of devices developed for alleviating the danger of skidding of the wheels of motor vehicles and to bring the motor vehicle under control again after skidding has been initiated. The various designs have achieved success in varying degree with some being more effective on ice surfaces and some being more effective on snow surfaces or rain covered surfaces. The different types of studs, tire attachments and chain arrangements have varied effective means on certain type of surfaces and all of them are effective to some degree on all of the slippage surfaces.

One type of assembly which is adapted for removable engagement with tires and which works effectively on all types of slippage surfaces is that disclosed in my U.S. Pat. No. 3,817,307. The easily attachable and detachable nature of the assembly disclosed in that patent and its automatic shifting between a relatively inoperative position to an operative position upon tire slippage and then back to the inoperative position after the slippage has been stopped has been an extreme improvement in the art. In fact, economical construction and longevity of the product have enhanced its value. Its dependability in operation and effectiveness on all types of slippage surfaces is accepted as being highly effective. Naturally, a structure which will retain the beneficial effects of the design of my previous patent and which will additionally provide further features which enhance the structure, operability and effectiveness of the product in use on different types of surfaces would be extremely advantageous and enthusiastically received in the automotive tire field.

SUMMARY OF THE INVENTION

Thus, with the above background in mind, it is among the objectives of the present invention to provide an antiskid assembly which is adapted for removable attachment to a tire structure in a similar manner as accomplished with the structures of the patent mentioned above. Additionally, an improved anchoring means is provided and includes a braided high strength attaching member interconnected to the transverse road contacting strap members in a manner which is easy and efficient to accomplish and which does not detract from the strength of the attaching member. The anchoring means includes a quick acting assembly and disassembly fastening arrangement at its ends to provide the necessary attachment for mounting the assembly to the tire. Furthermore, the strap of the present invention is designed for one or more studs to extend upward from the surface of the strap distal from the surface in normal engagement with the tire for the purpose of enhancing the surface contact between the straps and the road. The studded strap is adapted for use with the braided member or an attaching member of alternative material such as that disclosed in my above mentioned patent and metal, woven fabric, plastic or a combination thereof. The provision of the one or more studs also enhances gripping of the straps with the road surface when skidding does occur and serves to assist in shifting the straps into the perpendicular or fully operative positions to stop the skidding action. There are a varied number of stud arrangements suggested all showing structures which are of low cost in both design and assembly and which provide the additional road surface engagement desired in areas where there is extremely poor road conditions and slippage or skidding is most likely to occur. It should also be kept in mind that the objectives of the present invention include a single strap arrangement with a fastener member attached to the ends thereof of the braided material and which employs the studded arrangement to facilitate its use in occasions of high slippage conditions.

In summary, an anti-skid assembly is provided and is adapted to be removably mounted on a tire having a pair of opposed side walls in a peripheral road contacting outer circumferential surface. The assembly includes a plurality of deformable straps with each strap having a greater width than thickness and having a length sufficient to permit the central portion of each strap to extend transversely to the circumferential surface of the tire across the entire surface and the end portions of the strap to extend beyond in adjacent relationship to at least a portion of the opposed side walls of the tire. Anchor means is connected to the straps and is adapted to removably attach the assembly to the tire with the straps being in spaced relationship on the outer surface of the tire. The central portion of each strap is adapted to be normally positioned on the circumference of the tire with the dimensional width sides being substantially parallel with the circumferential surface of the tire. When the tire is rotating in normal engagement with a road surface, each strap will remain in the normal position and offer minimum resistance to driving engagement between tire and road. When the tire slips on the road surface, engagement between each strap and the road will cause the strap to automatically deform so at least a portion of the dimensional width on the underside of the strap is brought into a position that is approximately perpendicular to the circumferential surface of the tire. The frictional and mechanical engagement with the road surface is thus increased thereby leading to stoppage of the slippage and return of the tire to normal engagement with the road surface. At that time, the strap will automatically return to its normal configuration and position. Each anchor means includes a pair of braided cables adapted to be positioned on each side of the side walls of the tire with each of the braided cables being attached to one end of each of the straps by fastener means passed through the parted braided cables and attached to the strap ends. The cables normally have a substantially circular configuration and at least one of the cables includes detachable means for facilitating mounting and dismounting of the assembly with respect to a tire.

Other forms of the invention include studs projecting upwardly from the exposed surface of each strap in its normal position to assist in initial traction with the road surface and to assist in shifting the straps to the operative maximum antiskid position when slippage does occur. In addition to use with the braided cable, the studded strap is adapted for use with a variety of different materials for cables such as metal, fabric and plastic, for example. Furthermore, quick release detachable means is employed whereby the ends of the cable containing the detachable means can be quickly and easily interconnected and disconnected at will.

With the above objectives, among others in mind, reference is had to the attached drawings.

BRIEF DESCRIPTION OF THE DRAWINGS

In the Drawings

FIG. 5 is a fragmentary sectional view of an anchoring cable portion of the assembly showing a connector rivet passing therethrough;

FIG. 6 is a fragmentary sectional view of a portion of the assembly showing the connection between the strap and the connector cable;

FIG. 7 is a fragmentary sectional view thereof taken through along the plane of line 5—5 of FIG. 6;

FIG. 8 is a fragmentary sectional view thereof showing the detachable connector for connecting the ends of the connecting cable in attached condition;

FIG. 21 is a fragmentary sectional elevation view showing the formation of a connection between a strap end and a cable in riveted form;

FIG. 22 is a fragmentary sectional elevation view showing the connection between a strap and cable in bolted form; and FIG. 23 is a top plan view of two different types of interconnection between cable and strap ends.

DESCRIPTION OF THE PREFERRED EMBODIMENTS

Figure 1:
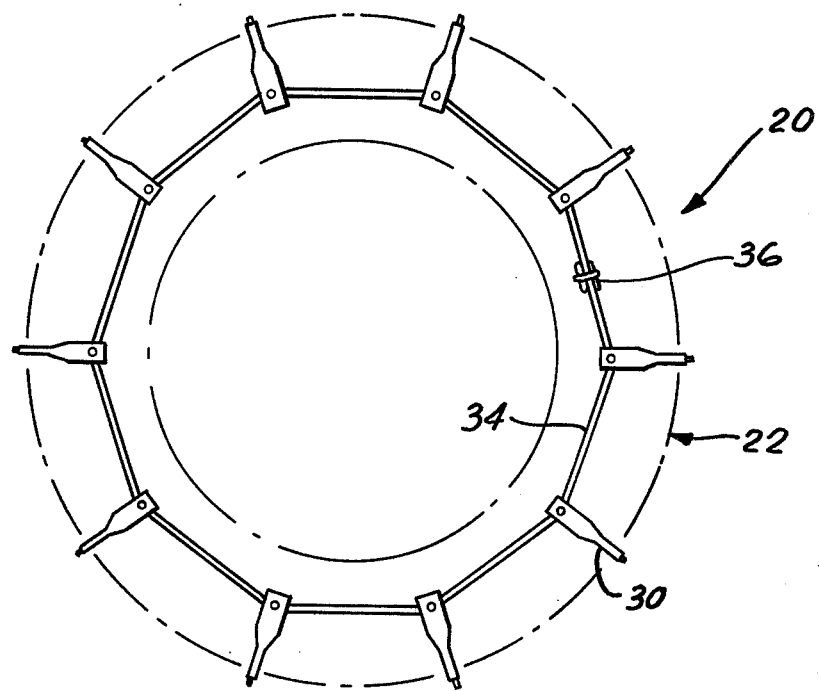
FIG. 1 is a perspective view of the assembly of the present invention mounted on a tire with the straps in norml non-skidding operating condition.
Figure 2:
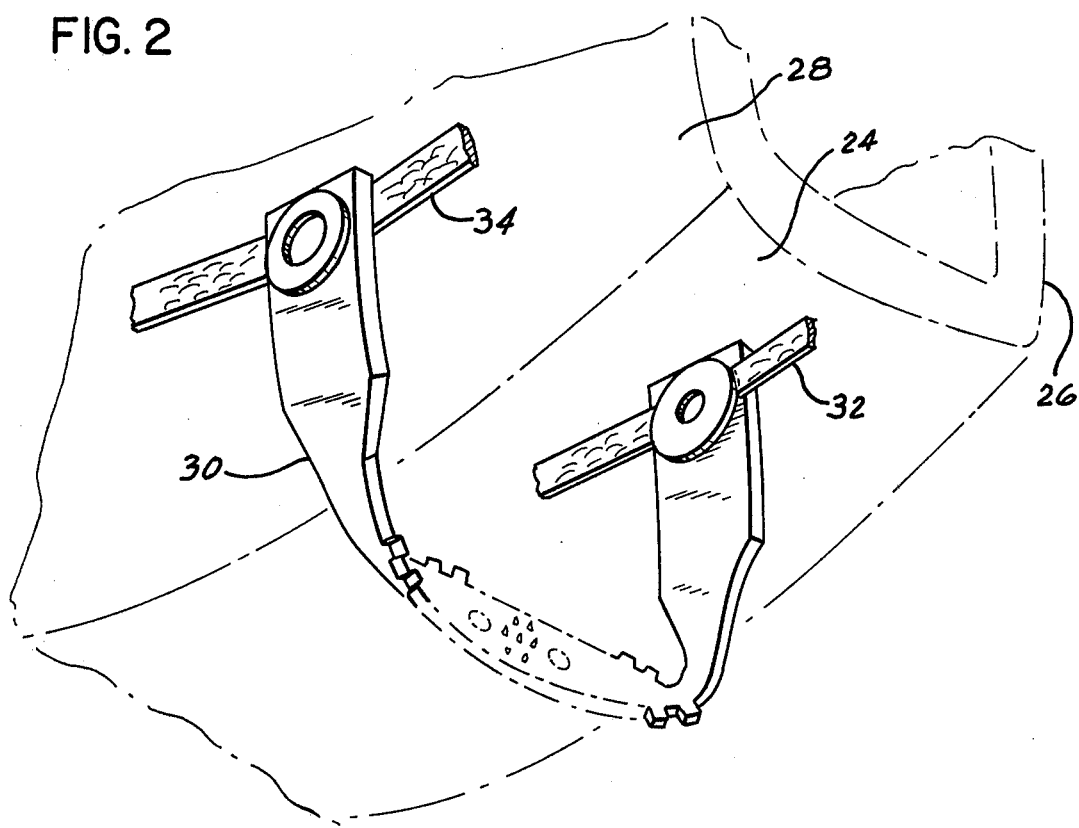
FIG. 2 is a perspective view thereof showing the appropriately positioned straps being deformed to increase road engagement during slippage of the tire with the road surface to thereby increase traction.

FIGS. 1 and 2 show anti-skid assembly 20 mounted on a tire 22 with FIG. 1 showing the assembly 20 in normal position when the tire is properly rotating with respect to a road surface and FIG. 2 depicts the position of the assembly when it has been automatically shifted to an operative position at which it gives maximum traction to the road surface to stop slippage when the tire is in a skid relative to the road surface.

The tire is of a conventional type having a treaded circumferential road engaging surface 24 and a pair of opposing side walls 26 and 28.

Assembly 20 includes a plurality of spaced straps 30 mounted transversely on the road engaging tire surface 24. The straps are substantially parallel to one another and are mounted at their ends to a pair of opposing anchor cables 32 and 34. The anchor cables are of sufficient length so as to permit the cable to extend circumferentially around the side wall of tire 22. At least one of the cables, preferably the cable exposed to the exterior side of the tire when it is mounted on a vehicle includes a detachable means 36 which permits quick release attachment and detachment of the ends of a cable 32 or 34 when it is desired to remove the assembly from the tire or to mount the assembly on the tire.

The general configuration of the assembly 20 including the cables 32 and 34 and the straps 30 is substantially the same as the embodiment shown in FIGS. 15-18 of U.S. Pat. No. 3,817,307. There are differences in structural details which will be specifically discussed below.

Anchor cables 32 and 34 are constructed of a braided fabric which is formed into a rope-like structure. The braided fabric provides a similar strength to that of the webbing used in U.S. Pat. No. 3,817,307 and has additional advantages in that it is possible to separte the braids at the location of points of connection. For example, in FIG. 5 it is shown how the braids of anchor cable 32 are parted to permit passage of a rivet 38 used to make the connection to a strap end or any other connection. By being able to separate the braids there is no reduction in strength of anchor member 32 which could occur if holes were punched in the anchor member 32. Naturally hole punching could require reinforcement around the location of the hole. This is unnecessary where the fabric can be braided and separated to permit passage of the rivet. It has been found that a conventional braided fabric can be utilized of a material such as polyester and the materical can be one that does not vary in length so that the anchor member can be properly sized for the tire on which it is to be utilized.

Figure 4:
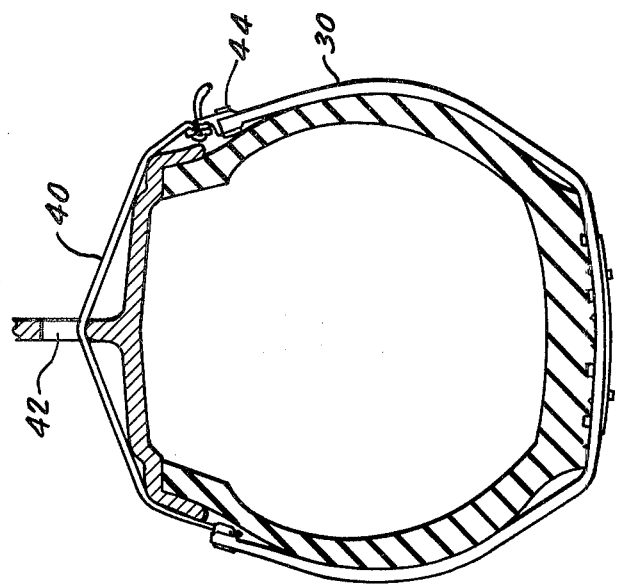
FIG. 4 is a sectional view thereof taken through the plane of line 4—4 of FIG. 3.
Figure 3:
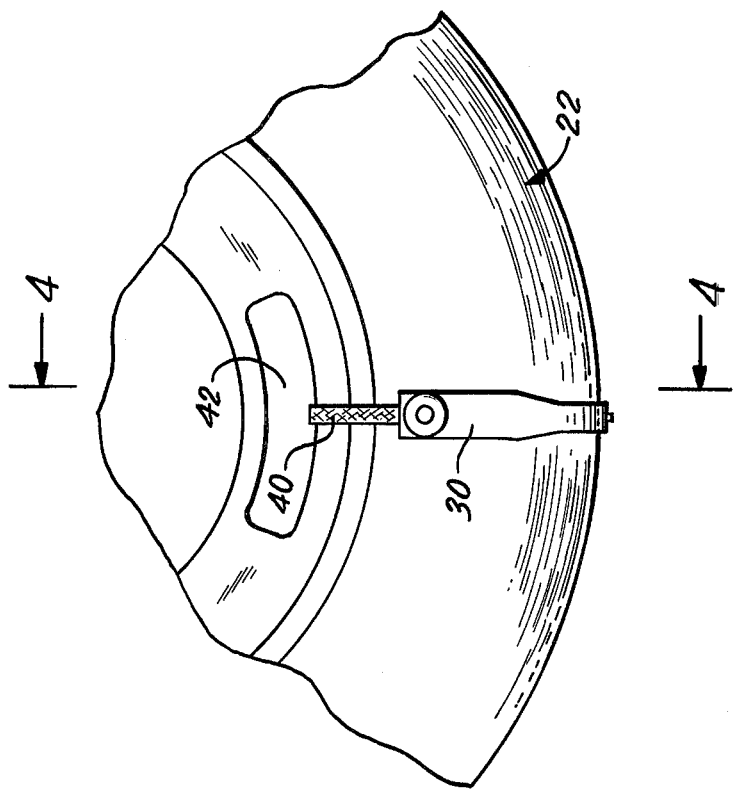
FIG. 3 is a fragmentary side elevation view of a further embodiment of the invention showing a single strap anchored to a tire.
Figure 9:
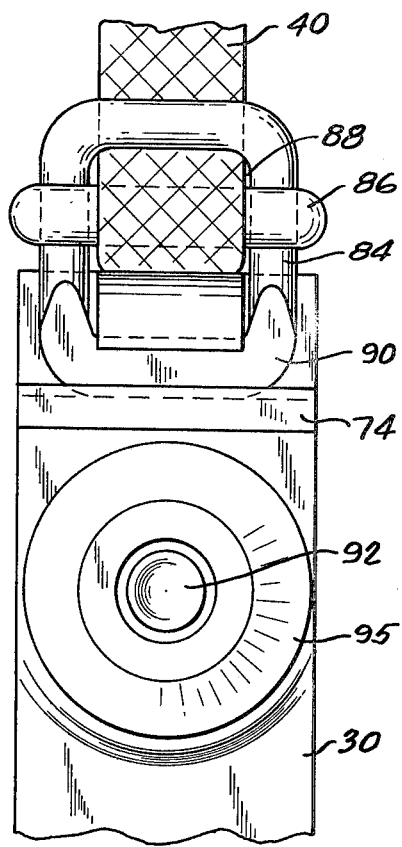
FIG. 9 is a fragmentary front view thereof taken in the direction of the arrow 9 in FIG. 8.
Figure 10:
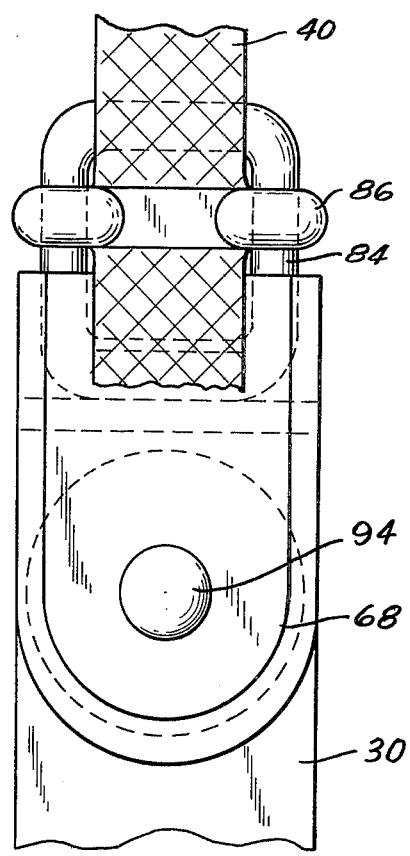
FIG. 10 is a fragmentary rear view thereof taken in the direction of arrow 10 in FIG. 8.

Alternatively as shown in FIGS. 3 and 4, a single strap 30 which is the same as the straps of the FIG. 1 and FIG. 2 embodiment can be connected to a single anchor member 40 of the same material as anchor member 32. Anchor member 40 is much shorter in length than anchor member 32 and is used to connect a single strap 30 to a tire 22 by having a similar detachable means such as detachable means 36 in the embodiment of FIGS. 1 and 2 and being of sufficient length to pass through an appropriate aperture 42 in the tire. The actual separation point for anchor strap 40 can be intermediate its ends or at the location of connection to one end of strap 30 such as by means of connection assembly 44. In the embodiment of FIGS. 3-8, the detachable means 44 is located at the point of interconnection with one end of strap 30. The other end of anchor member 40 is permanently attached to the other end of strap 30. Details of these points of attachment are depicted in FIGS. 5-8 and the manner of attachment is the same as for the embodiment of FIGS. 1 and 2. The single strap attachment of FIGS. 3-8 is alternative to the multi-strap assembly of FIGS. 1 and 2 or is supplemental to that arrangement.

The interconnection at the non-detachable end as shown in FIGS. 6 and 7 is accomplished by aligning the end portion of strap 30 which is of slightly greater thickness than the intermediate portion of the strap with the end of the braided anchor cable 40. An appropriate aperture 46 is present in end 30 and is aligned with aperture 48 of cap 50 and aperture 52 of cap 54. The caps are positioned on opposing sides of strap 30 and capture strap 30 and cable 40 therebetween with the holes therethrough in alignment with the hole in strap 30. The exposed surfaces of caps 50 and 54 include counter sunk entrance ways 56 and 58 respectively to provide the necessary recesses for passage and mounting of rivet 38 therein. The rivet has a tubular body portion 60 and an enlarged head 62 on one end. Insertion of rivet 38 through the aligned apertures will seat head 62 within the recess 56 in one cap and the opposite end portion of the rivet 38 in recess 58. Rolling over of the ends of the rivet in conventional fashion locks the rivet to the surrounding cap surface and in turn locks the anchor cable 40 to strap 30. The rivets may be of a conventional metal material and the caps can be formed of a conventional low cost metal or plastic material which is of sufficient strength and hardness to maintain the integrity of the riveted connection.

Braided anchor cable 40 is detachably interconnected to form a continuous loop and detachable connector means 64 is utilized for this purpose. Connector assembly 64 is shown in detail in FIG. 8 of the drawings. It includes a rigid nylon or plastic receptacle hook 66 which has rectangularly shaped mating surfaces for engaging with one side of the end portion and edge of strap 30 so as to form a longer leg portion 68 with an aperture 70 therein to receive a rivet therethrough and a shorter leg portion 72 having an upright side wall 74 integrally formed with an arcuately shaped hook portion 76. The undersurface of the hook portion forms a circular recess 78 with the inner surface of side wall 74 and the hook 76 terminates in a vertical edge 80 which is parallel to and spaced from inside edge 82 of wall 74. The space between parallel edges 80 and 82 is less than the diameter of the arcuately shaped receiving recess 78.

The free end of cable 40 has a metal or rigid plastic rectangularly shaped loop 84 mounted thereon by means of a locking bar 86 affixed to the loop 84 intermediate the ends thereof and substantially bisecting an aperture 88 through the center of loop 84. The end of cable 40 is passed through one portion of aperture 80 and over bar 86 and back through the other portion of aperture 88 doubling the cable upon itself and adjustably fixing the length of cable 40. The end of loop 84 which extends beyond attached cable end 40 is of greater width than diameter so that it forms a locking tongue 90. By positioning tongue 90 with its narrower dimension in alignment with the aperture formed between walls 80 and 82, the tongue 90 can be passed therebetween and into larger arcuate recess 78. Thereafter, the locking tongue 90 can be rotated 90° permitting its larger dimension to be exposed to the opening between walls 80 and 82 and retaining the tongue in position and the ends of cable 40 in attached condition. The wider dimension of tongue 90 is slightly less but approximately equal to the diameter of arcuate recess 78 thereby facilitating the rotation and positioning of the tongue within the recess in the latched position.

To uncouple the cable ends, it is only necessary to rotate the tongue 90 the same 90° to bring the smaller dimension of the tongue 90 into alignment with the opening between walls 80 and 82 at which time the loop 84 can be removed from receptacle 68. In this manner, the coupling and uncoupling of the strap ends can be quickly and efficiently carried out. To assemble the strap to a tire it is merely necessary to pass one free end of the strap and cable assembly through an appropriate opening 42 in the tire with strap 30 positioned on the tire surface as shown in FIGS. 3 and 4 for use and the tongue 90 appropriately positioned as described above in recess 78. If tightening of the strap and cable assembly is necessary, it is merely required to draw back on the free end of the loop of cable 40 formed on bar 86. Bar 86 is mounted in position by deforming the ends thereof into arcuate loops around the sides of loop 84 until they substantially encircle the sides of loop 84 and are crimped in that position so as to affix bar 86 to loop 84. The same type of detachable means can be employed as detachable means 36 in the embodiment of FIGS. 1 and 2.

The longer leg of receptacle 66 is provided with an aperture 70 through which rivet 92 is passed with enlarged head 94 of the rivet bearing against the surface of the receptacle surrounding aperture 70. An appropriate cap 95 is positioned with an aligned aperture 96 on the opposite side of the end of strap 30 to receive rivet 92 therethrough. The rivet ends are then turned over in conventional fashion to engage with the surface of cap 95 holding the cap and receptacle to the strap 30. The portion of cap 95 surrounding aperture 96 is counter sunk to form recess 98 so that the end portion of rivet 92 is below the exposed surface of cap 95.

Figure 11:
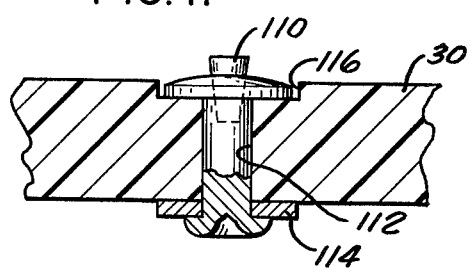
FIG. 11 is a fragmentary sectional view showing one form of stud mounted on a strap of the invention.
Figure 12:
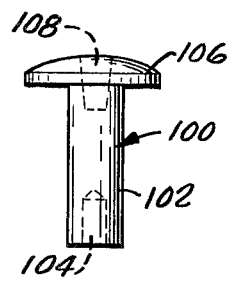
FIG. 12 is a side elevation view of the rivet utilized to form the stud of FIG. 11.

There are many different types of stud structures that can be employed to make the stops of the depicted embodiment with road engaging stud 41. The studded straps can be used with a braided cable as shown and described above in connection with the embodiment of FIGS. 1-10. Alternatively it can be used with cables of other material such as chain, other metal, woven fabric, plastic or a combination of materials. Some of these structures are depicted in FIGS. 11-22 of the drawings. Stud 100 of FIG. 12 is designed for assembly to strap 30 as shown in FIG. 11. The stud 100 includes a tubular body 102 having a central aperture 104 in one end to receive a rivet locking tool and having an enlarged head 104 on the other end. In the center of the top surface of head 106 is a tapered aperture 108 which is adapted to receive a tapered insert therein in tight frictional engagement. The insert 110 is shown in position in FIG. 11 and partially extends above the upper surface of head 106. Insert 110 is of an extremely hard material such as high carbide steel to increase the longevity and biting characteristics of the stud in use. Stud 100 as is the case with all of the stud discussed is of a hard material such as steel but need not be necessarily as hard as the high carbide steel of insert 111. In fact, for ease of assembly and rolling over the ends of the rivets to lock it in position it is desirable to have a rivet of less hardness than insert 110 to facilitate assembly. As shown in FIG. 11, the stud 100 in the form of a rivet is inserted through an appropriate aperture 112 in strap 30 and through an aligned aperture in washer 114 on the underside of strap 30. The riveting tool then is inserted through central aperture 104 in the bottom end of stud 100 and the ends are turned over locking the stud in position in strap 30. The head 106 of the stud is positioned in a recess 116 in the upper surface of strap 30 formed by counter sinking the portion of the strap surrounding aperture 112. In this manner, substantially only the hardened insert 110 is exposed to direct road surface contact and the head 106 is protected within recess 116. It has been found that a tungsten carbide material is extremely effective for use as insert 110. Washer 114 can be of a hard metal or plastic material. It should have sufficient hardness to accept the rivet roll-over.

Figure 13:
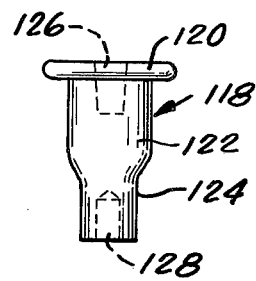
FIG. 13 is a side elevation view of an alternative form of rivet to be utilized in the formation of the stud of FIG. 11.
Figure 14:
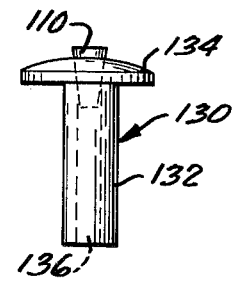
FIG. 14 is a further alternative form of rivet for utilization in formation of the stud of FIG. 11.

Other designs for the stud which can be assembled to strap 30 in the same manner are depicted in FIGS. 13 and 14. Stud 118 of FIG. 13 is also in the form of a rivet and has an annular shaped head 120 and a wider upper body portion 122 terminating in an integrally formed lower body portion 124. An appropriate tapered aperture 126 is present in the head end for receipt of the insert in an appropriate central bore 128 in the opposite end is provided for receipt of the riveting tool. Stud 130 of FIG. 14 also is in the form of a rivet and includes a tubular body 132 and an enlarged head 134. The difference in structure from stud 100 resides in the nature of the bore arrangement with a continuous axial bore 136 being provided through the length of the stud. In this manner, one end of the bore is adapted to receive the riveting tool and the other end of the bore is adapted to receive insert 110.

Figure 15:
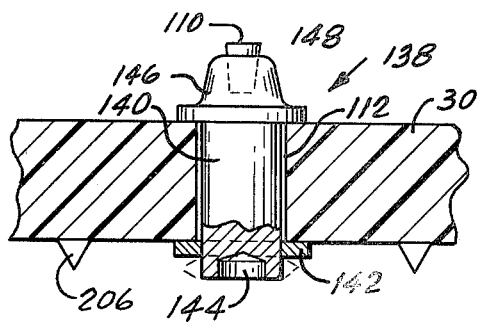
FIG. 15 is a fragmentary sectional elevation view of an alternative form of stud to be utilized with the strap in accordance with the present invention.

Another type of stud 138 is shown in FIG. 15 where the stud takes the form of a screw machine shell having a smaller diameter tubular body portion 140 adapted to pass through the aperture 112 in the central portion of strap 30 and through an aperture in washer 142 to be rolled over and riveted in position as shown in dotted lines in FIG. 15. An appropriate central aperture 144 is formed in the end which passes through the washer to receive the riveting tool. The opposed end has an enlarged head portion 146 with a central aperture 148 to receive insert 110 of the hardened material.

Figure 16:
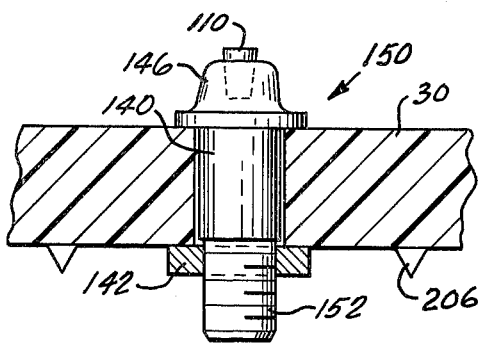
FIG. 16 is a fragmentary sectional elevation view of another form of stud.

Stud 150 of FIG. 16 has the identical configuration of the embodiment of FIG. 15 and is also of a screw machine shell type design. However, the end 152 which extends through aperture 112 is threaded to receive an appropriate nut 142 in threaded interengagement to lock the stud 150 in position. The positioning of the insert 110 is accomplished in a similar manner as in the previous embodiment.

Figure 17:
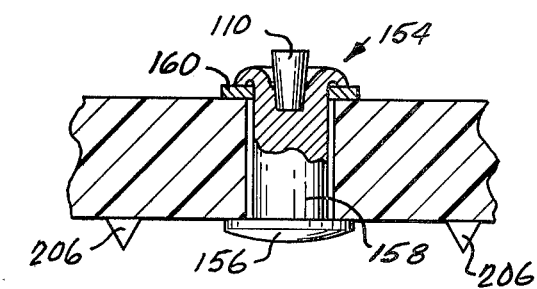
FIG. 17 is a fragmentary sectional view of still another form of stud.

FIG. 17 shows a further form as stud 154 which is once again in the form of rivet, this time with the head portion 156 on the underside of strap 30 and the body portion 158 of lesser diameter passing through aperture 112 in the strap and through an appropriate aperture in washer 160 on the upper surface of strap 30. A single opening is present in the end of body portion 158 distal from head portion 156 to operate as a dual function opening first to receive the riveting tool to provide roll-over for the end of the body portion 58 onto the surface of washer 160 and then to receive insert 110 therein thereby forming the stud.

Figure 18:
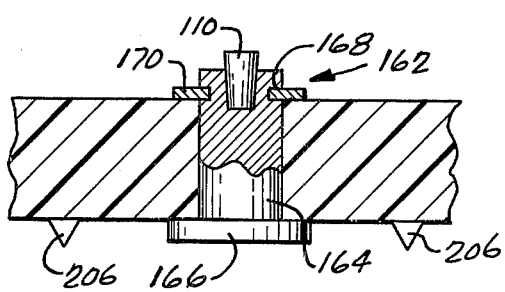
FIG. 18 is a fragmentary sectional elevation view of still another form of stud.

Stud 162 of FIG. 18 is in the form of a tubular body 164 having an enlarged head 166 engaging with the undersurface of strap 30. Tubular body 164 passes through aperture 112 and has an annular groove 166 adjacent the end distal from the head. The groove extends beyond the upper surface of strap 30 and is adapted to receive a snap ring 170 to lock the stud 162 in position. An appropriately tapered aperture in the upper end of the stud body 164 is adapted to receive insert 110 to form the exposed stud for road engagement.

Figure 19:
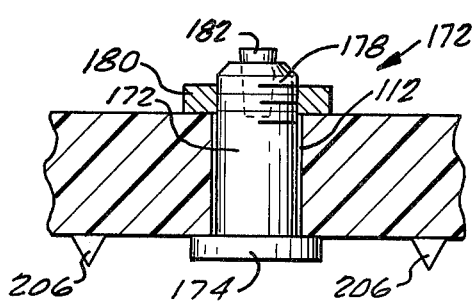
FIG. 19 is a fragmentary sectional elevation view of still another form of stud.

FIG. 19 shows a stud 172 which has an enlarged head 174 engaging with the undersurface of strap 30 and a tubular body 176 of lesser diameter passing through aperture 112 with at least the end portion of the tubular body having a threaded outer surface 178 to receive an appropriate nut 180 to lock the stud in position. An appropriate central aperture is provided to receive tapered insert 182.

Figure 20:
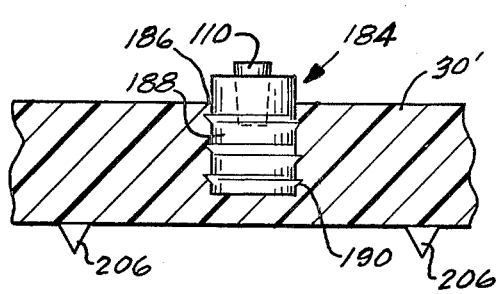
FIG. 20 is a fragmentary sectional elevation view of a further form of stud.

A final form of stud 184 is depicted in FIG. 20. Instead of a through hole in strap 30', a recess 186 is provided in the upper surface in which is inserted a portion of a tubular stud 188. The stud material is the same as the stud material for the previous embodiments and includes a central aperture in the upper surface thereof to receive the hardened carbide insert 110. In this embodiment, the stud may be positioned by pressing or molding it into the strap 30' and includes a plurality of ribs 190 spaced along the portion inserted in recess 186 to serve in securing the stud 184 in the elastomeric material.

FIGS. 21 and 22 show the use of bolts or rivets to provide the interconnection between anchor cable 40 and strap 30. In FIG. 21 it is shown how the apertures in the strap 30 and cable 40 are aligned with the appropriate apertures in caps 54 and 50 as described in connection with FIGS. 6 and 7 and then the rivet is inserted through the aligned apertures with the end portions being housed in the counter sunked recesses in the caps. A riveting tool 192 is then moved downward into the receiving riveting recess to provide roll-over of the ends of the rivet and lock it in position locking the caps and strap and anchor member together.

An alternative form of attachment of the same members may be accomplished as depicted in FIG. 22 by means of a threaded bolt 194 and a threaded nut 196 with the head of the bolt being received in the counter sunk recess in cap 50 and the nut being received in the counter sunk recess in cap 54. Naturally other conventional fastening means well known in the art can be substituted for the riveting and bolting arrangements depicted in FIGS. 21 and 22.

Strap 30 as shown in FIG. 23 has a central portion 198 of narrow diameter. In the normal relaxed position when mounted on the tire it has a small dimensioned thickness with projecting ribs 200 extending laterally on the tire exposed surface. The upper exposed surface of the central portion 198 includes a lattice of ribs 202 to provide additional traction for the tire under normal operating conditions and two studs 204 spaced on the surface of the central portion 198 and extending upwardly therefrom. The studs once again facilitate normal traction with the road. The undersurface of central portion has a plurality of pointed prongs 206 extending downwardly therefrom which bite into the tire surface and tend to hold each strap in relatively fixed position on the tire when it is in normal position and the tire is rotating and not skidding with respect to the road surface. When a skid is initiated, the lateral projections 200 facilitate gripping of the strap with the road surface and twisting of the strap into the right angle position as shown in FIG. 2 to expose the undersurface of central portion 198 to the road surface and enhance the gripping characteristics. In that position, the pointed projections 206 also assist in addition to the enlarged surface area exposed to the road due to the width of strap 30 in stopping the skid. Once past the road contacting area, the strap will return to its initial configuration as shown in FIG. 1 and in FIG. 23. In this manner, operation of the device depicted and described herein is the same as the device of U.S. Pat. No. 3,817,307.

FIG. 23 also shows two alternative methods of fastening the ends of strap 30 to the anchors 40. In one form the anchor is merely connected to the ends of the strap 30 in the manner depicted in FIGS. 6, 7 and 21.

However, alternatively as shown in respect to strap 30a as shown in FIG. 23 partially in phantom, the strap ends include a pair of wings 208 with apertures 210 therein to receive the cable anchor 40 therethrough. This type of arrangement strengthens the cable attachment. The cable is first threaded through one aperture 210 and then is mounted in a similar fashion as described above by riveting or bolting to the strap and then passes through the other aperture 210 thereby permitting the loops 208 to bear some of the stress when the strap is twisted with respect to the cable as the strap shifts automatically between the operative and inoperative positions.

To facilitate the shifting action, the central portion of strap 198 extends outwardly into a narrower neck portion 212 which does not contain projections 200. Neck portion 212 then is integral with an outwardly tapering extension 214 which communicates with a wider strap end 216. The connection to cable 40 is made by means of an aperture through the end of portion 216 in the manner described above. The narrower central portion tapering outwardly into a wider end portion facilitates the twisting of the strap between the flat position with respect to the tire and the perpendicular position with respect to the tire in both directions. In this manner the strap operates identical to the straps of U.S. Pat. No. 3,817,307.

The present assembly 20 is designed for use with or without the studs in the central portion of the strap. The nature of the braided anchor member 40 and the quick release nature of the detachable means for interconnecting the ends of the anchor are individually improvements in design. When studs are used, the number of studs is a matter of choice with two being the preferred number and as stated above the stud inserts can be of tungsten carbide or other similar hardened material such as stainless steel. It should also be noted that in a number of the embodiments of studs which are depicted and described above, there is a portion of the stud which extends above the exposed surface of the strap in addition to the insert 110. This exposed portion provides an additional stop surface when the hardened insert wears off. The rivets and studs can be formed of a conventional steel material and the tapered hole for the insert can be formed in any conventional fashion such as by drilling.

The material for straps 30 and 30' and 30a is of a similar nature as the material described in U.S. Pat. No. 3,817,307 such as a flexible high strength material like polyurethane plastic or a high strength rubber.

Thus the several aforenoted objects and advantages are most effectively attained. Although several somewhat preferred embodiments have been disclosed and described in detail herein, it should be understood that this invwention is in no sense limited and its scope is to be determined by that of the appended claims.

What is claimed is:

1. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the surface and assisting in stopping the slippage and returning the tire to normal engagement with the surface at which time the strap will automatically return to its normal configuration and position; and each anchor means including a pair of braided cables adapted to be positioned on each of the side walls of a tire respectively and each of said braided cables being attached to one side of each of said straps by fastener means passed through the parted braided cables between separate integral parts in order to avoid damaging or weakening of the cables and attached to the strap ends, at least one of the cables including detachable means for facilitating mounting and dismounting of the assembly with respect to a tire.

2. The invention in accordance with claim 1 wherein each strap includes at least one stud intermediate the ends thereof and passing therethrough with a projecting portion extending upwardly from the side of the strap distal from the tire surface when the strap is in the normal relaxed position on the tire surface.

3. The invention in accordance with claim 1 wherein at least the road contacting portion of the strap in the normal position is thin and narrow and in general conformation with the road contacting surface of the tire to thereby provide minimum protrusion from the road contacting surface of the tire and facilitating a relatively smooth tire and road interengagement under normal conditions and the ends of the strap being wider than the central portion thereof to facilitate return of the strap to the normal position and the strap having an intermediate flexible portion between each end and the middle thereof to aid in shifting of positions of the strap.

4. The invention in accordance with claim 1 wherein each anti-skid assembly is mounted on a tire.

5. The invention in accordance with claim 2 wherein each stud is a metal member passing through the central portion of the strap and extending upwardly therefrom, the upwardly extending portion including a central opening into which is extended a harder metal insert which extends upwardly therefrom to form a further projection extending from the exposed surface of the strap to further enhance the gripping surface of the strap in normal engagement with the road.

6. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position;

each anchor means including a pair of braided cables adapted to be positioned on each of the side walls of a tire respectively and each of said braided cables being attached to one side of each of said straps by fastener means passed through the parted braided cables between separate integral parts in order to avoid damaging or weakening of the cables and attached to the strap ends, at least one of the cables including detachable means for facilitating mounting and dismounting of the assembly with respect to a tire;

at least one stud extending through the central portion of each strap and projecting upward from the surface of the strap distal from the tire surface to provide additional road engaging contact when the strap is in the non-operative position and to facilitate engagement with the road surfaces;

at least the road contacting portion of the strap in the normal position being thin and narrow and in general conformation with the road contacting surface of the tire to thereby provide minimum protrusion from the road contacting surface of the tire and facilitating a relatively smooth tire and road interengagement under normal conditions and the ends of the strap being wider than the central portion thereof to facilitate return of the strap to the normal position and the strap having an intermediate flexible portion between each end and the middle thereof to aid in shifting of positions of the strap; and each stud being a metal member passing through the central portion of the strap and extending upwardly therefrom, the upwardly extending portion including a central opening into which is extended a harder metal insert which extends upwardly therefrom to form a further projection extending from the opposed surface of the strap to further enhance gripping surface of the strap in normal engagement with the road.

7. An anti-skid assembly element adapted to be connected to a tire structure having a pair of opposed side walls and a peripheral road contacting outer circumferential surface and anchor means thereon to receive said element comprising:

a strap having a substantially greater width than thickness and having a length sufficient to permit the central portion of the strap to extend transverse to the circumferential surface of the tire across the entire surface and the end portions of the straps to extend beyond in adjacent relationship to at least a portion of the opposed side walls of the tire;

each strap adapted to be connected to receiving surfaces on the tire and including anchor means for fastening the ends of the strap together and the strap to the tire;

the central portion of each strap adapted to be normally positioned on the circumference of the tire with the dimensional width sides being substantially parallel with the circumferential surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform, the undersurface of the strap is brought into contact with the road surface thereby increasing frictional engagement with the road and assisting in stopping the skid and returning the tire to normal engagement with the road at which time the strap will automatically return to its normal configuration and position; and the anchor means including a braided cable having one end attached to one end of the strap and the other end attached to the other end of the strap to form a loop and detachable connecting means on the braided cable and strap adapted to be shifted between an open and closed position to permit the strap and cable to be mounted and dismounted from the tire as desired, the braided cable being attached to the strap by fastener means passed through the parted braided cable between separate integral parts in order to avoid damaging or weakening of the cable when attached to the strap.

8. The invention in accordance with claim 7 wherein the strap includes at least one stud intermediate the ends thereof and passing therethrough with a projecting portion extending upwardly from the side of the strap distal from the tire surface when the strap is in the normal relaxed position on the tire surface.

9. The invention in accordance with claim 7 wherein at least the road contacting portion of the strap in the normal position is thin and narrow and in general conformation with the road contacting surface of the tire to thereby provide minimum protrusion from the road contacting surface of the tire and facilitating a relatively smooth tire and road interengagement under normal conditions and the end of the strap being wider than the central portion thereof to facilitate return of the strap to the normal position and the strap having an intermediate flexible portion between each end and the middle thereof to aid in shifting of positions of the strap.

10. The invention in accordance with claim 7 wherein each stud is a metal member passing through the central portion of the strap and extending upwardly therefrom, the upwardly extending portion including a central opening into which is extended a harder metal insert which extends upwardly therefrom to form a further projection extending from the exposed surface of the strap to further enhance the gripping surface of the strap in normal engagement with the road.

11. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on soft surface engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the soft surface and assisting in stopping the slippage and returning the tire to normal engagement with the soft surface at which time the strap will automatically return to its normal configuration and position;

at least one stud extending through the central portion of each strap and projecting upward from the surface of the strap distal from the tire surface to provide additional road engaging contact when the strap is in the non-operative position;

the anchor means including at least one cable adapted to be positioned on one of the side walls of a tire and being attached to one side of each said straps and a fastening means being provided on the at least one cable facilitating mounting and dismounting of the assembly with respect to a tire;

the fastening means including a rigid receptacle mounted to one end of the cable and including a lateral wall adjacent to an arcuate hook extending upward and toward the wall, the distance between the undersurface of the hook and the wall being greater than the distance between the terminal upper edge of the hook and the wall;

a rigid loop attached to the other end of the cable and being rectangular in cross section to facilitate its insertion between the end of the hook and the wall when turned in one direction and then rotated into a second orientation whereby it is accommodated between the wall and the undersurface of the hook but not permitted to pass between the wall and the end of the hook thereby attaching the cable ends together, and when turned to the initial position the loop can be removed along the path of initial insertion for detachment and disassembly of the cable ends for removal of the assembly from the tire.

12. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the strap adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire slips on engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the surface and assisting in stopping the slippage and returning the tire to normal engagement with the surface at which time the strap will automatically return to its normal configuration and position;

each anchor means including a pair of braided cables adapted to be positioned on each of the side walls of a tire respectively and each of said braided cables being attached to one side of each of said straps by fastener means passed through the parted braided cables and attached to the strap ends, at least one of the cables including detachable means for facilitating mounting and dismounting of the assembly with respect to a tire;

the detachable means including a rigid receptacle mounted to one end of the cable and including a lateral wall adjacent to an arcuate hook extending upward and toward the wall, the distance between the undersurface of the hook and the wall being greater than the distance between the terminal upper edge of the hook and the wall;

a rigid loop attached to the other end of the cable and being rectangular in cross section to facilitate its insertion between the end of the hook and the wall when turned in one direction and then rotated into a second orientation whereby it is accommodated between the wall and the undersurface of the hook but not permitted to pass between the wall and the end of the hook thereby attaching the cable ends together, and when turned to the initial position the loop can be removed along the path of initial insertion for detachment and disassembly of the cable ends for removal of the assembly from the tire surface.

13. An anti-skid assembly element adapted to be connected to a tire structure having a pair of opposed side walls and a peripheral road contacting outer circumferential surface and anchor means thereon to receive said element comprising:
 a strap having a substantially greater width than thickness and having a length sufficient to permit the central portion of the strap to extend transverse to the circumferential surface of the tire across the entire surface and the end portions of the strap to extend beyond in adjacent relationship to at least a portion of the opposed side walls of the tire;
 each strap adapted to be connected to receiving surfaces on the tire and including anchor means for fastening the ends of the strap together and the strap to the tire;
 the central portion of each strap adapted to be normally positioned on the circumference of the tire with the dimensional width sides being substantially parallel with the circumferential surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform, the undersurface of the strap is brought into contact with the road surface thereby increasing frictional engagement with the road and assisting in stopping the skid and returning the tire to normal engagement with the road at which time the strap will automatically return to its normal configuration and position;
 the anchor means including a braided cable having one end attached to one end of the strap and the other end attached to the other end of the strap to form a loop and detachable connecting means on the braided cable and strap adapted to be shifted between an open and closed position to permit the strap and cable to be mounted and dismounted from the tire as desired;
 said detachable connecting means including a rigid receptacle mounted to one end of the cable and including a lateral wall adjacent to an arcuate hook extending upwardly and toward the wall, the distance between the undersurface of the hook and the wall being greater than the distance between the terminal upper edge of the hook and the wall;
 a rigid loop attached to the other end of the cable and being rectangular in cross section to facilitate its insertion between the end of the hook and the wall when turned in one direction and then rotated into a second orientation whereby it is accommodated between the wall and the undersurface of the hook but not permitted to pass between the wall and the end of the hook thereby attaching the cable ends together, and when turned to the initial position the loop can be removed along the path of initial insertion for detachment and disassembly of the cable ends for removal of the element from the tire.

14. An anti-skid assembly element adapted to be connected to a tire structure having a pair of opposed side walls and a peripheral road contacting outer circumferential surface and anchor means thereon to receive said element comprising:
 a strap having a substantially greater width than thickness and having a length sufficient to permit the central portion of the strap to extend transverse to the circumferential surface of the tire across the entire surface and the end portions of the straps to extend beyond in adjacent relationship to at least a portion of the opposed side walls of the tire;
 the strap adapted to be connected to receiving surfaces on the tire and including anchor means for fastening the ends of the strap together and the strap to the tire;
 the central portion of the strap adapted to be normally positioned on the circumference of the tire with the dimensional width sides being substantially parallel with the circumferential surface of the tire so that when the tire is rotating in normal engagement with the road surface each strap will remain in the normal position and offer minimum resistance to driving engagement between tire and road and when the tire skids on a road surface frictional engagement between each strap and the road will cause the strap to automatically deform so that at least a portion of the dimensional width and the undersurface of the strap is brought into contact with the road surface thereby increasing frictional engagement with the road and assisting in stopping the skid and returning the tire to normal engagement with the road at which time the strap will automatically return to its normal configuration and position;
 at least one stud extending through the central portion of the strap and projecting upwardly from the surface of the strap distal from the tire surface to provide additional road engaging contact when the strap is in the non-operative position;
 said anchor means including at least one cable member adapted to be positioned on a side wall of the tire;
 fastening means provided on the at least one cable facilitating mounting and dismounting of the assembly with respect to the tire;
 the fastening means including a rigid receptacle mounted to one end of the cable and including a lateral wall adjacent to an arcuate hook extending upwardly and toward the wall, the distance between the undersurface of the hook and the wall being greater than distance between the terminal upper edge of the hook and the wall;
 a rigid loop attached to the other end of the cable and being rectangular in cross section to facilitate its insertion between the end of the hook and the wall and turned in one direction and then rotated into a second orientation whereby it is accommodated between the wall and the undersurface of the hook but not permitted to pass between the wall and the end of the hook thereby attaching the cable ends together, and when turned to the initial position the loop can be removed along the path of initial insertion for detachment and disassembly of the cable ends for removal of the assembly from the tire.

15. An anti-skid assembly adapted to be removably mounted on a tire having a pair of opposed side walls and a peripheral road contacting outer circumferential surface comprising:

a plurality of deformable straps with each strap having a greater width than thickness and having a length sufficient to permit the central portion of each strap to extend transverse to the circumferential surface of the tire across the entire surface and the end portions of the strap to extend beyond in adjacent relationship to at least a portion of the opposed side walls of the tire;

anchor means connected to the straps adapted to removably attach the assembly to the tire with the straps being in spaced relationship on the outer surface of the tire;

the central portion of each strap adapted to be normally positioned on the circumference of the tire with the dimensional width sides being substantially parallel with the circumferential surface of the tire so that when the tire is rotating in normal engagement with a road surface each strap will remain in the normal position and offer minimum resistance to driving engagement between tire and road and when the tire is subjected to surfaces tending to cause slippage, engagement between each strap and the road will cause the strap to automatically deform so that at least a portion of the dimensional width on the underside of the strap is brought into a position that is approximately perpendicular to the circumferential surface of the tire thereby increasing frictional and mechanical engagement with the road surface and assisting in stopping the slippage and returning the tire to normal engagement with the road surface at which time the strap will automatically return to its normal configuration and position;

at least the road contacting portion of each strap having a configuration permitting their shifting to the approximate perpendicular position and the automatic return to the normal configuration and position;

each strap being designed to operate to provide anti-skid action on soft surfaces, on semi-hard surfaces and on hard surfaces and the strap shifting between the normal and the approximate perpendicular positions a predetermined amount depending upon the hardness of the road surface with which it is in engagement to provide the necessary anti-skid action;

at least one stud extending through the central portion of each strap and projecting upward from the side of the strap distal from the tire surface to provide additional road engaging contact when the strap is in the normal position and the stud being of a predetermined height above the surface of the strap so that it does not interfere with the shifting of the strap to approximate perpendicular position; and each stud being positioned on a strap and dimensioned so that on soft surfaces the stud and strap improve traction and prevents skidding, on semi-hard surfaces the stud assists in initiating the shifting of the strap to the approximately perpendicular position without interfering with the shifting movement, and on hard surfaces on occasion when the strap does not rotate fully to the approximate perpendicular position the stud will dig in to provide anti-skid action.

16. The invention in accordance with claim 15 wherein the ends of each strap are wider than the central portion thereof to facilitate return of the strap to the normal position and the strap has an intermediate flexible portion between each end and the middle thereof to aid in shifting of position of the strap.

17. An anti-skid assembly element adapted to be connected to a tire structure having a pair of opposed side walls and a peripheral road contacting outer circumferential surface and anchor means thereon to receive said element comprising:

a strap having a greater width than thickness and having a length sufficient to permit the central portion of each strap to extend transverse to the circumferential service of the tire across the entire surface and the end portions of the strap to extend beyond in adjacent relationship to at least a portion of the opposed side walls of the tire;

the strap adapted to be connected to receiving surfaces on the tire and including anchor means on each end thereon for fastening the ends of the strap together and the strap to the tire;

the central portion of the strap adapted to be normally positioned on the circumference of the tire with the dimensional width sides being substantially parallel with the circumferential surface of the tire so that when the tire is rotating in normal engagement with a road surface the strap will remain in the normal position and offer minimum resistance to driving engagement between tire and road and when the tire is subjected to surfaces tending to cause slippage, engagement beweeen the strap and the road will cause the strap to automatically deform so that at least a portion of the dimensional width of the underside of the strap is brought into a position that is approximately perpendicular to the circumferential surface of the tire thereby increasing frictional and mechanical engagement with the surface and assisting in stopping the slippage and returning the tire to normal engagement with the road surface at which time the strap will automatically return to its normal configuration and position;

at least the road contacting portion of the strap having a configuration permitting its shifting to the approximate perpendicular position and the automatic return to the normal configuration and position;

the strap being designed to operate to provide anti-skid action on soft surfaces, on semi-hard surfaces and hard road surfaces and the strap shifting between the normal and approximate perpendicular positions a predetermined amount depending upon the hardness of the road surface with which it is in engagement to provide the necessary anti-skid action;

at least one stud extending through the central portion of the strap and projecting upward from the side of the strap distal from the tire surface to provide additional road engaging contact when the strap is in the normal position and the stud being of a predetermined height above the surface of the strap so that it does not interfere with the shifting of the strap to the approximate perpendicular position; and each stud being positioned on the strap and dimensioned so that on soft surfaces the stud and strap improve traction and prevent skidding, on semi-hard surfaces the stud assist in initiating the shifting of the strap to the approximately perpendicular position without interfering with the shifting movement, and on hard surfaces on occasion when the strap does not rotate fully to the approximate perpendicular position the stud will dig in to provide anti-skid action.

18. The invention in accordance with claim 17 wherein the ends of the strap are wider than the central portion thereof to facilitate return of the strap to the normal position and the strap has an intermediate flexible portion between each end and the middle thereof to aid in shifting of position of the strap.

19. Anti-skid strap adapted to be removably mounted on a tire having a pair of opposed side walls and a peripheral road contacting outer circumferential surface comprising:

the strap having a greater width than thickness and having a length sufficient to permit the central portion of the strap to extend transverse to the circumferential surface of the tire across the entire surface and the end portions of the strap to extend beyond in adjacent relationship to at least a portion of the opposed side walls of the tire;

attachment means on the strap for cooperation with anchor means to removably attach the strap to the tire;

the central portion of the strap adapted to be normally positioned on the circumference of the tire with the dimensional width sides being substantially parallel with the circumferential surface of the tire so that when the tire is rotating in normal engagement with a road surface the strap will remain in the normal position and offer minimum resistance to driving engagement between tire and road and when the tire is subjected to surfaces tending to cause slippage, engagement between the strap and the road will cause the strap to automatically deform so that at least a portion of the dimensional width of the underside of the strap is brought into a position that is approximately perpendicular to the circumferential surface of the tire thereby increasing frictional and mechanical engagement with the road surface and assisting in stopping the slippage and returning the tire to normal engagement with the road surface at which time the strap will automatically return to its normal configuration and position;

at least the road contacting portion of the strap having a configuration permitting its shifting to the approximate perpendicular position and the automatic return to the normal configuration and position;

the strap being designed to operate to provide anti-skid action on soft surfaces, on semi-hard surfaces and on hard surfaces and the strap shifting between the normal and approximate perpendicular position a predetermined amount depending upon the hardness of the road surface with which it is in engagement to provide the necessary anti-skid action;

at least one stud extending through the central portion of the strap and projecting upward from the side of the strap distal from the tire surface to provide additional road engaging contact when the strap is in the normal position and the stud being of a predetermined height above the surface of the strap so that it does not interfere with the shifting of the strap to the approximate perpendicular position; and each stud being positioned on the strap and dimension so that on soft surfaces the stud and strap improve traction and prevent skidding, on semi-hard surfaces the stud assists in initiating the shifting of the strap to the approximately perpendicular position without interfering with the shifting movement, and on hard surfaces on occasion when the strap does not rotate fully to the approximate perpendicular position the stud will dig in to provide anti-skid action.

20. The invention in accordance with claim 19 wherein the ends of the strap are wider than the central portion thereof to facilitate return of the strap to the normal position and the strap has an intermediate flexible portion between each end and the middle thereof to aid in shifting of position of the strap.

* * * * *

UNITED STATES PATENT OFFICE
CERTIFICATE OF CORRECTION

Patent No. 4,093,012          Dated June 6, 1978

Inventor(s) John H. Detwiler

It is certified that error appears in the above-identified patent and that said Letters Patent are hereby corrected as shown below:

Col. 3, line 3, the word "norml" should read --normal--;

Col. 4, line 26, the word "separte" should read --separate--;

Col. 6, line 58, the word "underside" should read --under-surface--;

Col. 8, line 27, the word "alternative" should read --alternate--;

Col. 17, claim 15, line 57, before the word "approximate" insert the word --the--;

Col. 18, claim 17, line 15, the word "service" should read --surface--.

Signed and Sealed this

Twenty-eighth Day of November 1978

[SEAL]

Attest:

RUTH C. MASON
Attesting Officer

DONALD W. BANNER
Commissioner of Patents and Trademarks